United States Patent [19]

Foti

[11] Patent Number: 5,960,338

[45] Date of Patent: Sep. 28, 1999

[54] SYSTEM AND METHOD OF DETECTING AND PREVENTING FRAUDULENT LONG DISTANCE TELEPHONE CALLS IN A RADIO TELECOMMUNICATIONS NETWORK

[75] Inventor: George Foti, Dollard des Ormeaux, Canada

[73] Assignee: Telefonaktiebolaget LM Ericsson, Stockholm, Sweden

[21] Appl. No.: 08/723,392

[22] Filed: Sep. 27, 1996

[51] Int. Cl.⁶ ...................................................... H04Q 7/22
[52] U.S. Cl. ........................... 455/405; 455/411; 455/414
[58] Field of Search .................................. 455/405, 410, 455/411, 414; 379/189

[56] References Cited

U.S. PATENT DOCUMENTS

| | | | |
|---|---|---|---|
| 3,784,757 | 1/1974 | Woolf et al. | 379/189 |
| 4,188,508 | 2/1980 | Rogers et al. | 379/189 |
| 4,955,049 | 9/1990 | Ghisler | 379/58 |
| 5,335,265 | 8/1994 | Cooper et al. | 455/410 |
| 5,353,331 | 10/1994 | Emery et al. | 455/414 |
| 5,357,564 | 10/1994 | Gupta et al. | 379/188 |
| 5,463,681 | 10/1995 | Vaios et al. | 379/189 |

Primary Examiner—Andrew M. Dollnar
Attorney, Agent, or Firm—Smith & Danamraj, P.C.

[57] ABSTRACT

A system and method in a radio telecommunications network having a home location register (HLR) and a serving mobile switching center (MSC) of preventing fraudulent long distance calls from a subscriber's mobile station by selectively barring the mobile station from accessing the network when an indication of fraud exists. The system sends from the serving MSC to the HLR, an indication of a long distance call origination from the subscriber's mobile station, starts a timer, increments a counter which counts long distance call originations, and determines whether the number of long distance call originations exceeds a predetermined threshold. The system allows the long distance call upon determining that the number of long distance call originations does not exceed the predetermined threshold. The system further determines whether a time period threshold has been exceeded, upon determining that the number of long distance call originations exceeds the predetermined threshold. The long distance call is allowed upon determining that the time period threshold has been exceeded. The call is disconnected, and the mobile station is barred from accessing the network upon determining that the time period threshold has not been exceeded.

17 Claims, 2 Drawing Sheets

SYSTEM AND METHOD OF DETECTING AND PREVENTING FRAUDULENT LONG DISTANCE TELEPHONE CALLS IN A RADIO TELECOMMUNICATIONS NETWORK

BACKGROUND OF THE INVENTION

1. Technical Field of the Invention

This invention relates to telecommunication systems and, more particularly, to a system and method of detecting and preventing fraudulent long distance telephone calls in a radio telecommunications network.

2. Description of Related Art

In existing radio telecommunications networks, fraudulent users may attempt to place free long distance telephone calls by causing the network to recognize the calls as being placed by a legitimate subscriber. Fraudulent users may clone the legitimate subscriber's mobile telephone, including the electronic serial number (ESN) and mobile identification number (MIN). Thereafter, the cloned telephone appears to the network to be the subscriber's legitimate telephone, thereby allowing a fraudulent user to place illegitimate long distance telephone calls.

Although there are no known prior art teachings of a solution to the aforementioned deficiency and shortcoming such as that disclosed herein, U.S. Pat. No. 4,955,049 to Ghisler discusses subject matter that bears some relation to matters discussed herein. Ghisler discloses a method of supervising subscribers in a mobile telephone system to detect fraudulent usage of a mobile telephone. Ghisler assigns a predetermined sequence of numbers to each mobile telephone in the system. Each time a call is made by a subscriber, the next number in the mobile telephone's assigned sequence is transmitted by the mobile station to the serving mobile switching center (MSC). The MSC records the numbers utilized, and detects a fraudulent call if there is a break in the sequence.

Ghisler, however, requires modification of each mobile station to store its assigned number sequence and transmit the next number in the sequence each time a call is made. It would be advantageous to have a method of detecting fraudulent telephone calls that does not require modification of the mobile station.

Review of each of the foregoing references reveals no disclosure or suggestion of a system or method such as that described and claimed herein.

In order to overcome the disadvantage of existing solutions, it would be advantageous to have a system and method of preventing fraudulent long distance calls by barring a mobile station's access to the network when certain conditions indicative of fraud are met. The mobile station would then be barred until the subscriber enters a proper personal identification number (PIN) code. The present invention provides such a system and method.

SUMMARY OF THE INVENTION

In one aspect, the present invention is a system for preventing fraudulent long distance calls from a mobile station by selectively barring the mobile station from accessing a telecommunications network when the system recognizes an indication of fraud. The system includes a database of subscriber information which includes information relating to a subscriber's activated features, a location for the subscriber's mobile station, a list of approved telephone numbers, and a called telephone number when the mobile station is engaged in a call. The system also includes feature logic connected to the database for performing functions related to the activated features and for denying services related to features that are not activated, and call-barring logic connected to the database and to the feature logic for selectively barring the mobile station from accessing the network when conditions indicative of fraudulent usage are detected.

In another aspect, the present invention is a method in a radio telecommunications network having a home location register (HLR) and a serving mobile switching center (MSC) of preventing fraudulent long distance calls from a subscriber's mobile station by selectively barring the mobile station from accessing the network when an indication of fraud exists. The method includes the steps of sending from the serving MSC to the HLR, an indication of a long distance call origination from the subscriber's mobile station, starting a timer, incrementing a counter which counts long distance call originations, and determining whether the number of long distance call originations exceeds a predetermined threshold. The method continues by allowing the long distance call upon determining that the number of long distance call originations does not exceed the predetermined threshold, and determining whether a time period threshold has been exceeded, upon determining that the number of long distance call originations exceeds the predetermined threshold. This is followed by allowing the long distance call upon determining that the time period threshold has been exceeded, and, upon determining that the time period threshold has not been exceeded, tearing down the call in which the subscriber is currently engaged, and barring the mobile station from accessing the network.

In yet another aspect, in a radio telecommunications network having a home location register (HLR) and a serving mobile switching center (MSC), a timer in the HLR, and a counter in the HLR, the present invention is a method of preventing fraudulent long distance calls from a subscriber's mobile station by selectively barring the mobile station from accessing the network when an indication of fraud exists. The method includes the steps of setting a minimum time interval for separating two successive long distance call originations, and receiving in the HLR, a first indication which indicates a first long distance call origination from the subscriber's mobile station. The method also includes the steps of starting the timer upon receiving the first indication, and then receiving in the HLR, a second indication which indicates a second long distance call origination from the subscriber's mobile station. This is followed by determining whether the second indication was received in a time interval after the first indication that is less than the minimum time interval, allowing the second long distance call upon determining that the second indication was received in a time interval after the first indication that is greater than the minimum time interval, and, upon determining that the second indication was received in a time interval that is less than the minimum time interval after the first indication, tearing down the call in which the subscriber is currently engaged, and barring the mobile station from accessing the network.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

The present invention is implemented in a radio telecommunications network such as a cellular telephone network. The network may include a plurality of mobile switching centers (MSCs) and one or more home location registers (HLRs) for storing subscriber records and mobile station location information. The present invention implements additional programming in the home location register (HLR) and defines a new inter-system signaling message dedicated to combatting fraud. The new message may be formatted in any suitable intersystem communications protocol. In the preferred embodiment, the message is formatted in accordance with IS-41, which is hereby incorporated by reference herein.

Figure 1:
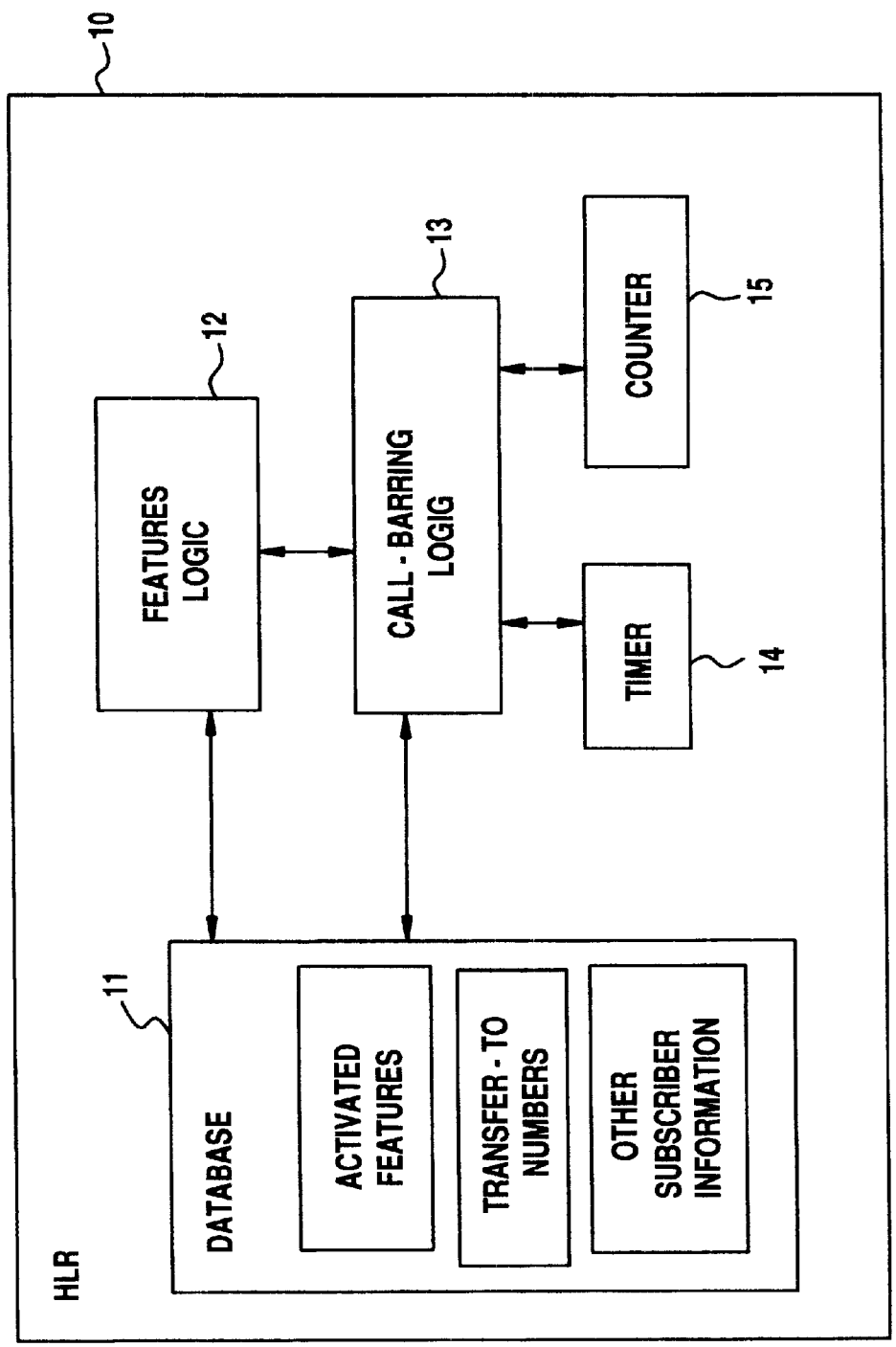
FIG. 1 is a block diagram of a home location register (HLR) that has been modified to activate a call-barring feature in accordance with the teachings of the present invention.

FIG. 1 is a block diagram of a home location register (HLR) 10 that has been modified to activate a call-barring feature in accordance with the teachings of the present invention. The HLR 10 includes a database 11 of subscriber information. The database includes information regarding which features are activated for each subscriber, the last reported location of the mobile station, an indication of the current activity status of the mobile station (i.e., active or inactive), and other subscriber information such as a list of approved telephone numbers that the mobile station is allowed to call. Internal feature logic 12 in the HLR then performs the necessary steps to carry out the functions related to the activated features, or to deny services related to features that are not activated, or are temporarily disabled.

The present invention adds additional logic to the HLR in the form of call-baring logic 13. The call-barring logic 13 functions to restrict or totally bar a mobile station's access to the telecommunications network when certain conditions, indicative of fraudulent usage, are detected. For example, the call-barring logic may bar the mobile station's access if the number of long distance calls originated by the mobile station within a predetermined period of time exceeds a predetermined threshold programmed into the logic. Likewise, the mobile station's access may be restricted or disabled if the time duration between successive long distance calls is less than a predetermined time duration threshold programmed into the logic. Also, the call-barring logic 13 may bar the mobile station's access if someone attempts to call a restricted telephone number such as an overseas or international telephone number, or attempts to call a number which is not on the list of approved telephone numbers. The call-barring logic 13 is completely automatic, and requires no operator intervention other than setting threshold values.

The call-barring logic 13 operates in conjunction with a timer 14 that measures the time periods between long distance call originations as well as an overall time period during which the total number of long distance call originations cannot exceed a predetermined number. The output of the timer 14 is compared to a predetermined time duration threshold. A counter 15 counts the number of long distance call originations attempted by the mobile station. The call-barring logic 13 takes inputs from the timer 14 and the counter 15 and determines whether or not the number of calls within a predetermined period of time exceeds the predetermined threshold. In addition to analyzing the total number of long distance call originations over a predetermined period of time, the call-barring logic also utilizes the timer 14 and counter 15 to determine whether any two successive originations occur too rapidly. In either case, if the call originations fall outside of allowable parameters, the call-barring logic then operates to tear down the current call and restrict or disable the mobile station's access to the network.

The HLR is programmed to recognize abnormal long-distance calling patterns. When a subscriber originates a long distance call, the mobile switching center (MSC) serving the subscriber sends a newly defined reporting message to the subscriber's home HLR. Upon receiving the reporting message, the HLR increments the counter 15. If the counter was previously at zero (0), the HLR also starts the timer 14. The timer, which may be configurable, is programmed with a predetermined time period during which, the subscriber may originate a maximum number of long distance telephone calls. If the subscriber exceeds this maximum number of long distance telephone calls before the expiration of the timer, the HLR automatically activates a call-barring feature for that subscriber. The HLR then resets the counter 15 and the timer 14 to zero. The subscriber must then enter a proper PIN code to deactivate the call-barring feature and place additional calls.

Several threshold values may be defined for the number of allowable long distance calls, and at each threshold, different corrective actions may be taken. For example, at a first threshold value, an alarm may be provided to the system operator to alert the operator of potential fraud. Other threshold values may apply to particular destinations such as international calls. Complete barring of all calls may be implemented only when the maximum threshold value has been reached.

Various alarm levels may be generated and provided to the system operator, depending upon the degree to which the threshold values are exceeded. As a result of achieving different alarm levels, the HLR 10 may take certain actions to restrict long distance call originations. For example, at one level, the subscriber may be required to input his PIN code when originating a long distance call. At other levels, the HLR may (for example):

(1) Bar long distance calls to certain destinations;
(2) Allow only local call originations (i.e., bar long distance call originations completely) if a second threshold level is exceeded; or
(3) Bar all call originations, if a third threshold level is exceeded. This list is not exhaustive, and other restrictive measures are possible and are within the scope and teachings of the present invention.

Figure 2:
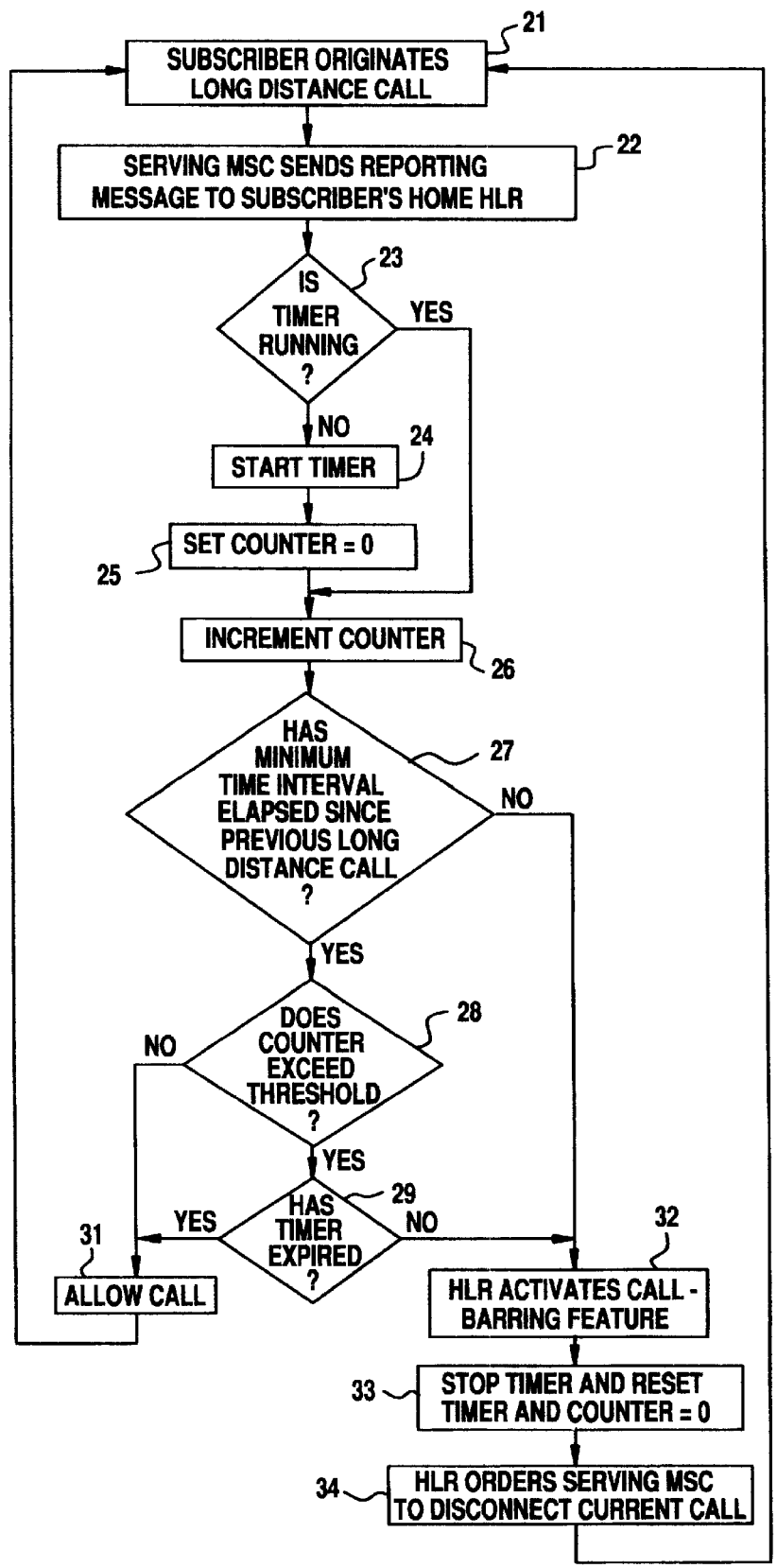
FIG. 2 is a flow chart illustrating the steps performed in the preferred embodiment of the method of the present invention.

FIG. 2 is a flow chart illustrating the steps involved in the preferred embodiment of the method of the present invention. The method begins at step 21 where the subscriber originates a long distance call. At step 22, the serving MSC sends a reporting message to the subscriber's home HLR and may include the mobile identification number (MIN) of the subscriber's mobile station, the location of the mobile station, and the called telephone number. The HLR may compare the called telephone number with the numbers on the list of approved telephone numbers. If the called number is not on the list, access to the network is denied. At step 23, it is determined whether or not the timer 14 is running. If not, the HLR then starts the timer 14 at step 24. The method then moves to step 25 where the counter 15 is set to zero (0). At step 26, the counter 15 is incremented. If it is determined at step 23 that the timer is already running, the method moves directly to step 26 and increments the counter.

At step 27, it is determined whether or not a minimum time interval has elapsed since the previous long distance call. If the minimum time interval has not elapsed, the method moves to step 32 where the call-barring logic 13 in the HLR restricts or disables the mobile station's access to the network. If the minimum time interval has elapsed at 27, the method moves to step 28 where it is determined whether or not the number of long distance call originations, as indicated by the counter 15, exceeds a predetermined threshold. If not, the long distance call is allowed at step 31. The method then returns to step 21 where the HLR waits for another long distance call origination to be received from the mobile station.

If, however, it is determined at step 28 that the number of long distance call originations exceeds the predetermined threshold, then the method moves to step 29 where it is determined whether or not the elapsed time period is less than a predetermined time period threshold (i.e., whether the timer 14 has expired). If the timer has expired, then the method moves to step 31 where the long distance call is allowed. If it is determined at 29 that the timer has not expired, then the method moves to step 32 where the call-barring logic 13 in the HLR restricts or disables the mobile station's access to the network. At step 33, the timer 14 and the counter 15 are then reset to zero. The HLR may also send a tear-down message to the serving MSC at step 34, ordering the serving MSC to disconnect the current call. The tear-down message includes the MIN of the mobile station and the subscriber's directory number so that the serving MSC can properly identify the call to be disconnected. Access from that mobile station to the network is denied until the identity of the subscriber is verified by, for example, the entry of a proper PIN code.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. In a radio telecommunications network having a home location register (HLR) and a mobile switching center (MSC), a system for preventing fraudulent long distance calls from a mobile station by selectively barring the mobile station from accessing said network when said system recognizes an indication of fraud, said system comprising:

a database of subscriber information in the HLR, said database including information relating to a subscriber's activated features, a location for said subscriber's mobile station, a list of approved telephone numbers, and a called telephone number when said mobile station is engaged in a call;

feature logic in the HLR connected to said database for performing functions related to said activated features and for denying services related to features that are not activated;

a timer in the HLR connected to call-barring logic in the HLR;

a counter in the HLR connected to the call-barring logic that counts long distance call originations from the mobile station;

means in the HLR for a system operator to set conditions indicative of fraudulent usage, said conditions including:

a minimum time interval for separating two successive long distance call originations from the mobile station;

a predetermined threshold number of long distance call originations from the mobile station; and a predetermined time period, during which the number of long distance call originations from the mobile station is counted by the counter; and wherein the call barring logic in the HLR that restricts the mobile station's access to the network upon determining that (1) any two successive long distance call originations from the mobile station occurred in a time interval less than the minimum time interval, or (2) the number of long distance call originations exceeds the predetermined threshold in less than the predetermined time period.

2. The system for preventing fraudulent long distance calls from a mobile station of claim 1 wherein said call-barring logic includes means for determining whether said predetermined threshold number of long distance call originations from said mobile station is exceeded during said predetermined time period.

3. The system for preventing fraudulent long distance calls from a mobile station of claim 2 further comprising means for disconnecting the current call upon determining that said predetermined threshold number of long distance call originations from said mobile station is exceeded during said predetermined time period.

4. The system for preventing fraudulent long distance calls from a mobile station of claim 3 wherein said telecommunications network includes a serving mobile switching center (MSC) serving said mobile station, and said means for disconnecting the current call includes means for sending a tear-down message to said serving MSC, said tear down message ordering said MSC to disconnect the current call.

5. The system for preventing fraudulent long distance calls from a mobile station of claim 4 wherein said tear down message includes a subscriber directory number and a mobile identification number for said mobile station.

6. The system for preventing fraudulent long distance calls from a mobile station of claim 1 wherein said call-barring logic includes means for barring the mobile station from accessing said network when a call origination is attempted from said mobile station to a telephone number that is not on said list of approved telephone numbers.

7. The system for preventing fraudulent long distance calls from a mobile station of claim 1 wherein the means for restricting the mobile station's access to the network utilizes a procedure selected from the group consisting of:

requiring the subscriber to input a personal identification number (PIN) when originating a long distance call;

barring long distance calls to certain destinations;

barring all long distance calls while allowing local call originations; and barring all call originations.

8. In a radio telecommunications network having a home location register (HLR), a method of preventing fraudulent long distance calls from a subscriber's mobile station by selectively barring the mobile station from accessing said network when an indication of fraud exists, said method comprising the steps of:

storing in said HLR, information relating to a subscriber's activated features, a list of approved telephone numbers, and a called telephone number when said mobile station is engaged in a call;

receiving in said HLR, an indication of a current long distance call origination from said mobile station, said indication including a mobile identification number (MIN) of the subscriber's mobile station, and the called telephone number;

determining in said HLR, whether said called telephone number is on said list of approved telephone numbers;

allowing the long distance call upon determining that said called telephone number is on said list of approved telephone numbers; and barring the mobile station from accessing said network upon determining that said called telephone number is not on said list of approved telephone numbers.

9. The method of preventing fraudulent long distance calls of claim 8 further comprising disconnecting the current call upon determining that said called telephone number is not on said list of approved telephone numbers.

10. In a radio telecommunications network having a home location register (HLR) and a serving mobile switching center (MSC), a method of preventing fraudulent long distance calls from a subscriber's mobile station by selectively barring the mobile station from accessing said network when an indication of fraud exists, said method comprising the steps of:

sending from said serving MSC to said HLR, an indication of a long distance call origination from said subscriber's mobile station;

starting a timer in the HLR;

incrementing a counter in the HLR which counts long distance call originations;

determining with call-barring logic in the HLR whether the number of long distance call originations exceeds a predetermined threshold;

allowing the long distance call upon determining that the number of long distance call originations does not exceed the predetermined threshold;

determining with call-barring logic in the HLR whether a time period threshold has been exceeded, upon determining that the number of long distance call originations exceeds the predetermined threshold;

allowing the long distance call upon determining that said time period threshold has been exceeded; and barring the mobile station from accessing said network by activating a call-barring feature in the HLR, upon determining that said time period threshold has not been exceeded.

11. The method of preventing fraudulent long distance calls from a subscriber's mobile station of claim 10 further comprising sending a tear-down message from the HLR to the serving MSC ordering the serving MSC to disconnect the current call.

12. The method of preventing fraudulent long distance calls from a subscriber's mobile station of claim 10 further comprising the steps of:

verifying the subscriber's identity; and restoring access to said network by said mobile station upon verifying the subscriber's identity.

13. The method of preventing fraudulent long distance calls from a subscriber's mobile station of claim 12 wherein said step of verifying the subscriber's identity includes requiring the subscriber to enter a personal identification number (PIN) code.

14. In a radio telecommunications network having a home location register (HLR) and a serving mobile switching center (MSC), a timer in said HLR, and a counter in said HLR, a method of preventing fraudulent long distance calls from a subscriber's mobile station by selectively barring the mobile station from accessing said network when an indication of fraud exists, said method comprising the steps of:

setting a minimum time interval in the HLR for separating two successive long distance call originations;

receiving in said HLR, a first indication, said first indication indicating a first long distance call origination from said subscriber's mobile station;

starting said timer in the HLR upon receiving said first indication;

receiving in said HLR, a second indication, said second indication indicating a second long distance call origination from said subscriber's mobile station;

determining with the timer in the HLR whether said second indication was received in a time interval after said first indication that is less than said minimum time interval;

allowing said second long distance call upon determining that said second indication was received in a time interval after said first indication that is greater than said minimum time interval; and barring the mobile station from accessing said network by activating a call-barring feature in the HLR, upon determining that said second indication was received in a time interval after said first indication that is less than said minimum time interval.

15. The method of preventing fraudulent long distance calls from a subscriber's mobile station of claim 14 further comprising sending a tear-down message from said HLR to the serving MSC ordering the serving MSC to disconnect the current call.

16. The method of preventing fraudulent long distance calls from a subscriber's mobile station of claim 14 further comprising the steps of:

verifying the subscriber's identity; and restoring access to said network by said mobile station upon verifying the subscriber's identity.

17. The method of preventing fraudulent long distance calls from a subscriber's mobile station of claim 16 wherein said step of verifying the subscriber's identity includes requiring the subscriber to enter a personal identification number (PIN) code.

* * * * *